No. 726,777. PATENTED APR. 28, 1903.
F. N. SMITH.
PIPE COUPLING.
APPLICATION FILED JULY 15, 1902.
NO MODEL.
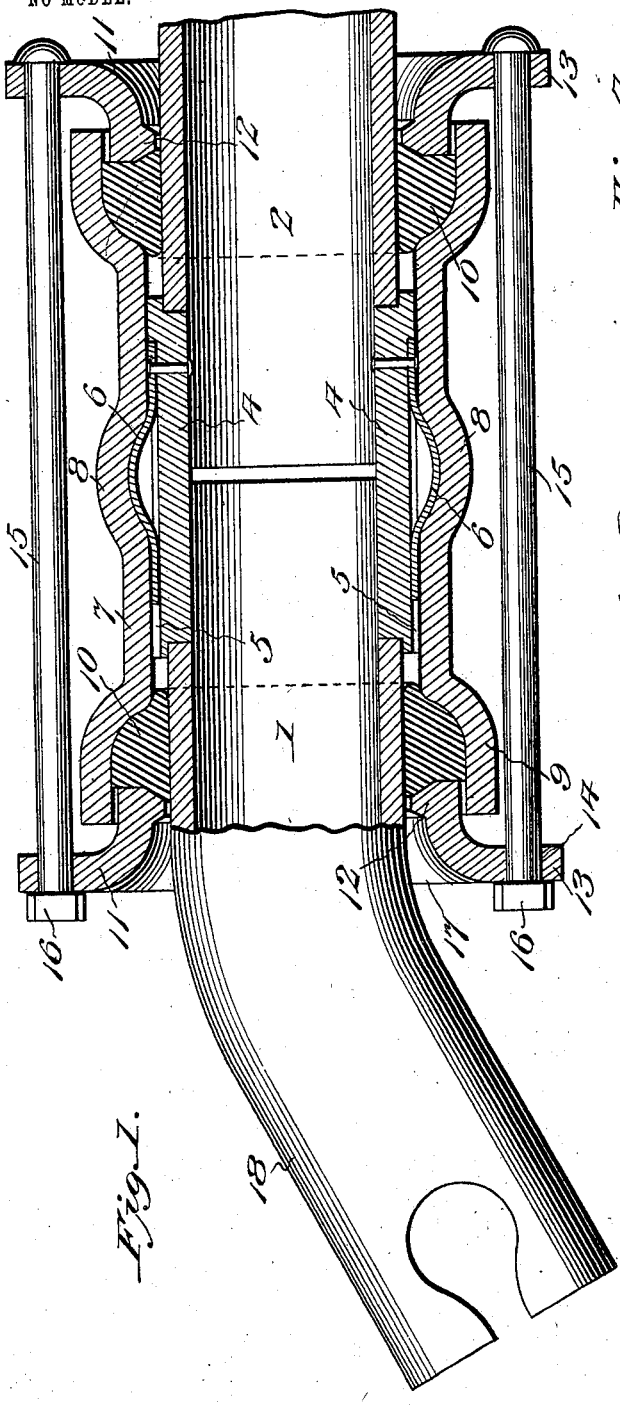
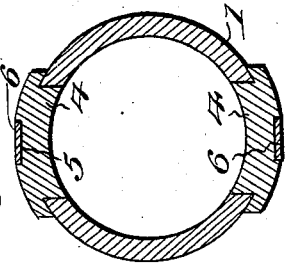
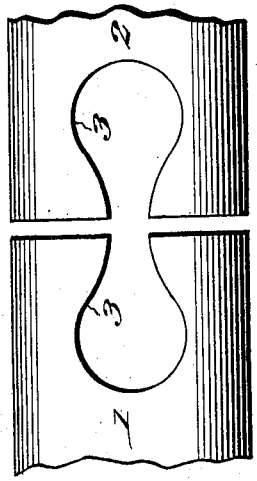
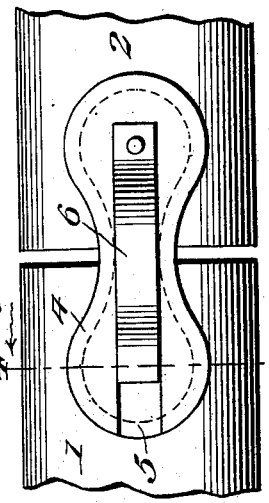
Witnesses
Edwin L. McKee
Chas. S. Hyer.
Inventor
Frank N. Smith
By Victor J. Evans
Attorney

UNITED STATES PATENT OFFICE.

FRANK N. SMITH, OF BRADFORD, PENNSYLVANIA.

PIPE-COUPLING.

SPECIFICATION forming part of Letters Patent No. 726,777, dated April 28, 1903.

Application filed July 15, 1902. Serial No. 115,726. (No model.)

*To all whom it may concern:*

Be it known that I, FRANK N. SMITH, a citizen of the United States, residing at Bradford, in the county of McKean and State of Pennsylvania, have invented new and useful Improvements in Pipe-Couplings, of which the following is a specification.

This invention relates to a pipe-coupling; and the primary object of the same is to provide a simple and effective means for connecting the ends of threadless pipes in such manner that they will be positively joined and leakage prevented, the improved coupling embodying means for accurately disposing it in applied position.

The invention consists in the construction and arrangement of the several parts, which will be more fully hereinafter described and claimed.

In the drawings, Figure 1 is a longitudinal vertical section of portions of pipes, showing the improved coupling applied thereto. Fig. 2 is a top plan view of portions of pipe, showing a connecting member, forming a part of the coupling, in operative relation to the ends of the pipes. Fig. 3 is a top plan view of the portions of the ends of pipes, showing seat-slots therein to receive the connector referred to by Fig. 2. Fig. 4 is a transverse vertical section on the line 4 4, Fig. 2.

Similar numerals of reference are employed to indicate corresponding parts in the several views.

The numerals 1 and 2 respectively designate sections of pipes which are devoid of threads, and adjacent to and opening out of the ends of said pipes are seat-slots 3, having outer enlarged circular portions continuing into reduced necks, and in the said slots 3 correspondingly-shaped flanged connectors 4 are inserted and prevent the pipe-sections from rotating or being drawn apart while applying the remaining portions of the coupling. Two of the connectors are used at diametrically upper and lower points in relation to the pipe-sections, and the flanges of the said connectors bear upon the outer surfaces of the pipe-sections adjacent to the slots 3. Each connector 4 has a longitudinal recess 5 in the outer surface thereof, which is loosely engaged by the free end of an outwardly-bowed flat spring 6, secured at one end to the connector, as clearly shown by Fig. 3. The springs 6 project in reverse directions at opposite points in relation to the connected pipe-sections and serve as centering as well as holding means for a sleeve 7, forming a part of the coupling and having central outwardly-projecting seats 8 to receive the bowed portions of the spring 6. The seats 8 are at diametrically opposite points, and in view of the formation of the recess 5 in each connector 4 the opposite terminals of the flat spring 6 in engagement therewith are countersunk flush with the outer surface of said connector, and the inner surface of the sleeve 8 on opposite sides of each seat is permitted to bear upon the terminal portions of the connector at opposite sides of the coupling to form a tight joint and assist in holding the connectors in the slots 3. The sleeve 7 is slipped over the pipe-sections 1 and 2 in a longitudinal direction, and during such application of the sleeve the connectors are prevented from becoming displaced in view of the flanged structure thereof. The opposite ends of the sleeve are flared outwardly, as at 9, to provide seats for rubber packing-rings 10, inserted therein and circumscribing the pipe-sections. Clamping-collars 11 are also removably applied on the pipe-sections, one adjacent to each end of the sleeve 7, each of said collars having an inwardly-extending bearing-flange 12 to press against the outer edge of the packing-ring 10 and an outwardly-extending securing-flange 13, both securing-flanges having openings 14 therein to receive clamping-bolt rods 15, headed at one end and bearing on the outer side of the flange 14 of one collar and terminally screw-threaded at the opposite end to receive securing-nuts 16, which bear against the outer side of the flange 14 of the other collar. The collars 11 are drawn tightly inward by securing the nuts 12 on the ends of the clamping-rods 15, and by this operation the inwardly-extending flanges 12 are pressed firmly against the packing-rings 10, and thereby force the latter inward to fill in crevices that may exist between the opposite ends of the sleeve 7 and the pipe-sections, and thus form a perfectly-tight joint. The bearing of the collars 11 on the pipe-sections is reduced to a minimum by forming the same with outwardly-flared openings 17, leading to the flanges 12, and after all the parts have been assembled as explained a rigid coupling is provided for the ends of pipe-sections which are constructed without threads. At any time desired the coupling may be removed by withdrawing the clamping-rods 15, moving the collars 11 outwardly, and slipping the sleeve 7 longitudinally over the pipe-sections.

The present improved coupling is particularly advantageous in permitting the use of pipe throughout the entire line of equal weight and dispensing with the ordinary elbows or bent unions by bending the pipe length itself, as clearly shown at 18, Fig. 1. To arrive at this result, the pipe length at the joint 18 may be bent by any of the well-known means and leakage, as at joints of the usual elbow form, is obviated, and it will be observed that the pipe-section 1, having the bend 18 therein, will be connected at opposite terminals to adjacent pipe-sections, as 2, and another similar to the latter by the use of the improved coupling.

In the construction of the several parts of the coupling materials best adapted for the purpose will be used, and to accommodate various applications changes in the form, proportions, and minor details of construction may be resorted to without departing from the spirit of the invention.

Having thus fully described the invention, what is claimed as new is—

1. A pipe-coupling comprising pipe-sections having slots formed adjacent to and opening through the opposing ends thereof, connectors of a shape corresponding to the slots and fitted in the latter and provided with outwardly-bowed centering-springs, a sleeve extending over the connectors and having seats to receive the springs and outwardly-flared ends, packing-rings mounted between the outwardly-flared ends of the sleeve and the pipe-sections, collars having portions engaging the said rings, and clamping-rods passing through the said collars.

2. The combination with pipe-sections, of connectors applied to the inner opposing ends thereof and having outwardly-projecting yielding devices carried thereby, and a sleeve immovably held over the pipe-sections and the connectors and provided with seats to receive the outwardly-projecting yielding devices.

In testimony whereof I affix my signature in presence of two witnesses.

FRANK N. SMITH.

Witnesses:
R. H. LEE,
SAML. ROBINS.